United States Patent [19]

Thompson

[11] Patent Number: 5,034,023
[45] Date of Patent: Jul. 23, 1991

[54] CERAMIC HONEYCOMB STRUCTURES AS OXYGEN SEPARATORS OR CONCENTRATORS

[75] Inventor: David F. Thompson, Painted Post, N.Y.

[73] Assignee: Corning Incorporated, Corning, N.Y.

[21] Appl. No.: 454,710

[22] Filed: Dec. 21, 1989

[51] Int. Cl.$^5$ .................. B01D 39/20; B01D 53/22
[52] U.S. Cl. ................................. 55/2; 55/11; 55/16; 55/158; 55/523; 429/30; 429/34; 429/41
[58] Field of Search .............. 55/2, 11, 12, 16, 128, 55/131, 133, 158, 523, 529; 429/30, 32, 33, 34, 41; 264/177.12; 204/164

[56] References Cited

U.S. PATENT DOCUMENTS

| Re. 28,792 | 4/1976 | Ruka et al. | 429/14 |
|---|---|---|---|
| 3,206,334 | 9/1965 | Ehrenfeld | 429/26 |
| 3,630,879 | 12/1971 | Spacil et al. | 204/248 |
| 4,041,591 | 8/1977 | Noll et al. | 55/523 |
| 4,041,592 | 8/1977 | Kelm | 55/523 |
| 4,151,060 | 4/1979 | Isenberg | 55/523 |
| 4,175,165 | 11/1979 | Adlhart | 429/30 |
| 4,195,119 | 3/1980 | Kummer | 429/38 |
| 4,279,974 | 7/1981 | Nishio | 429/104 |
| 4,283,210 | 8/1981 | Mochida et al. | 264/60 |
| 4,329,162 | 5/1982 | Pitcher, Jr. | 55/523 |
| 4,420,316 | 12/1983 | Frost et al. | 55/523 |
| 4,557,773 | 12/1985 | Bonzo | 264/60 |
| 4,877,506 | 10/1989 | Fee et al. | 204/242 |

Primary Examiner—Jay H. Woo
Assistant Examiner—James P. Mackey
Attorney, Agent, or Firm—Gary H. Levin; Richard N. Wardell

[57] ABSTRACT

Ceramic honeycombs made of a ceramic material of a solid electrolyte nature having at least some of the honeycomb channels sealed at one of the faces are useful for the concentration or separation of oxygen from air or other oxygen-containing gaseous mixture. The oxygen-containing gas is introduced into a first set of channels at one face of the honeycomb, a first voltage is applied to the interior walls of those channels, and a second voltage applied to the interior walls of the second set of remaining channels, thereby creating an electrical potential across the ceramic material separating any adjacent channels of the two sets. The electrical potential drives oxygen ions through the channel walls releasing concentrated oxygen into the second set of channels for collection therefrom.

12 Claims, 2 Drawing Sheets

CERAMIC HONEYCOMB STRUCTURES AS OXYGEN SEPARATORS OR CONCENTRATORS

BACKGROUND OF THE INVENTION

This invention relates to the preparation of a honeycomb structure having at least some channels that are sealed at one of the faces of the honeycomb and to the use of such a honeycomb for separation or concentration of oxygen. More particularly, the invention relates to honeycombs made of ceramic material of a solid electrolyte nature having channel walls that are permeable to oxygen ions. Such structures are particularly useful for the concentration of oxygen from air in small scale "point of use" systems for the production of oxygen.

For example, medical grade oxygen for health care, including hospital and home care, has been supplied by three primary sources—cryogenic, compressed gas tanks, and oxygen concentrators. Although all the sources are suitable for hospital use, where size and patient mobility are not necessarily of concern, none has been entirely satisfactory for home health care, where efficiency and mobility of the source for the patient and for the therapist become more important. For example, cryogenic sources are too large and cost ineffective for low volume home care, and compressed tank oxygen, although more portable and efficient, requires constant replenishment. Currently available oxygen concentrators, which have been used for home care as well as hospital care, can produce as much as three liters of 90% oxygen through the use of zeolite sieves to separate oxygen from ambient air. Although not requiring constant replenishment, these concentrators, at approximately 80 pounds, are still not easily portable.

In order to provide a concentrator of much smaller size, the present invention takes advantage of the high surface area and solid electrolyte properties of certain ceramic materials in a separation system in which oxygen ions are transported through the walls of a ceramic honeycomb by a difference in electrical potential between adjacent channels. It is known that certain electrically conductive, oxygen-permeable materials can be used as solid electrolyte separator plates or membranes in a process in which oxygen is driven from one side of the plate to the other by the application of a direct voltage across the plate. See, for example, U.S. Pat. No. Re 28,792, which discloses an electrochemical device useful as a fuel cell or oxygen separator/concentrator based on the use of plates of certain ionically conductive oxides as the solid electrolyte through which the oxygen ions are passed. U.S. Pat. No. 4,175,165 discloses another fuel cell assembly involving a multitude of solid electrolyte plates that are placed in parallel and separated by an alternating series of electrically conductive bipolar plates. Although these designs are useful generally in the operation of fuel cells or oxygen separators/concentrators, they have practical drawbacks in that materials used to seal the plates must be able to withstand operating temperatures of about 800° C. without cracking. Moreover, when a group of cells is to be used, they must be stacked and wired in series, so that a failure of one cell causes failure of the entire stack.

In order to overcome these and other problems, the present invention replaces the complicated structures of the prior art by a relatively simple monolithic ceramic honeycomb of particular composition (preferably stabilized zirconia, $\beta$-alumina, thoria, and/or mullite) having inlet channels and outlet channels that are spatially arranged and electrically connected so as to emulate a series of stacked flat plates. In such a system, the entire cell can be of a single material, which eliminates many cracking problems caused by the use of different structural materials having different thermal expansion characteristics, and provides to the cell the mechanical strength and thermal stability that ceramic materials are known to have.

SUMMARY OF THE INVENTION

The present invention provides a method of separating or concentrating oxygen from air or other gaseous mixtures in which a monolithic ceramic honeycomb of particular design and composition is used in place of the stacked plate electric cell structures heretofore used. The honeycomb can also be used in reverse mode as a fuel cell. The monolithic ceramic honeycomb body useful in the invention is of ceramic material which is an oxygen-ion conductive solid electrolyte, preferably stabilized zirconia, thoria, $\beta$-alumina, mullite, or mixtures of these. The honeycomb body has first and second faces and a plurality of substantially parallel channels that are separated from each other by partition walls and that extend through the body between the faces. A subset of the channels is hermetically sealed at the first face and open at the second face, and the remaining channels are hermetically sealed at the second face and open at the first face. The subset of channels has a first electrically-conductive coating on the interior walls thereof, forming a first electrode surface, and the remaining channels have a second electrically conductive coating on the interior walls thereof, forming a second, separate electrode surface. In the oxygen separation/concentration method of the present invention, air or another oxygen-containing gaseous mixture is introduced into the channels open at the first face of the honeycomb, a first voltage is applied to the interior walls of those channels, and a second voltage is applied to the interior walls of the channels open at the second face, thereby creating an electrical potential across the ceramic material separating adjacent first-face-open and second-face-open channels. This electrical potential drives oxygen ions from the air or other oxygen-containing mixture through the channel walls, releasing concentrated oxygen into the channels open to the second face, where the oxygen is collected.

In a further embodiment of the invention, the honeycomb that is used is substantially as described above but with the modification that given channels are sealed at the first face but open at the second face, and the remaining channels are open at both faces. The honeycomb is further provided with at least one manifold affixed to the second face, each manifold covering and hermetically isolating openings of the given channels at the second face from the openings of the remaining channels at the second face, and each manifold having a single outlet whereby the openings of given channels covered by any one manifold are in communication with each other and with the single outlet of the manifold. In a preferred variation of this embodiment, the given channels and remaining channels are arranged in the honeycomb in parallel rows, with each row of given channels opening into a separate manifold. In the operation of this embodiment of the invention, the oxygen-containing gaseous mixture is introduced into the openings of the remaining channels at one or both faces, and with the application of an electrical potential as described above, oxygen is collected at the manifold outlet.

In yet another aspect of the invention, there is provided a self-manifolded ceramic honeycomb of the kind described above that is useful in oxygen concentration/separation operations or fuel cell operations. The manifold element of the honeycomb is preferably of the same ceramic material as is used in the honeycomb body itself. The manifold is structurally affixed to the honeycomb to cover given channel openings on a particular face of the honeycomb so that oxygen discharging from all such covered openings during operation of the honeycomb as a separator/concentrator is combined and retrievable from a single point. When the manifolding element is fitted to the honeycomb body while both are in the green state, subsequent firing of the body results in a manifold that is integrally connected to the honeycomb body itself, providing a unitary structure that is both strong and able to withstand the high temperatures of expected use.

DETAILED DESCRIPTION OF THE INVENTION

Figure 1:
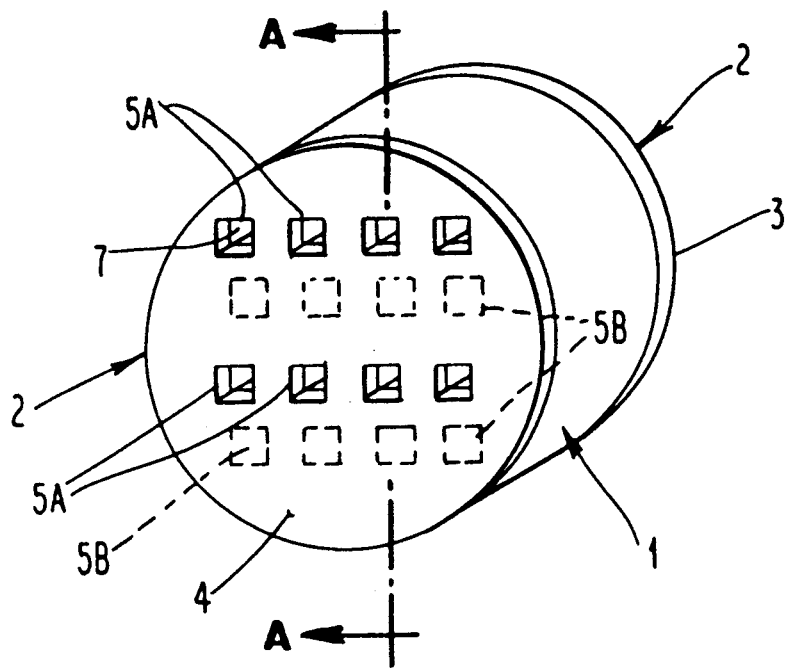
FIG. 1 is a perspective view of a ceramic honeycomb having selectively sealed channels of the kind useful in the method of the present invention.

The present invention is based at least in part on the finding that monolithic honeycomb structures made from certain ceramic materials can be used in place of the stacked plate electric cell structures that have been used in the past as oxygen separators or concentrators, oxygen detectors, or oxygen-consuming fuel cells. The method of the invention takes advantage of the porous nature and solid electrolyte properties of particular ceramic materials to provide a system in which oxygen ions can be transported through the partition walls of the honeycomb by a difference in electrical potential between adjacent channels therein, or in which oxygen ions can be driven through the walls by a concentration differential between adjacent channels, as in fuel cell operations, to generate a voltage.

In the practice of the invention, the ceramic material selected for the preparation of the honeycomb body is preferably one which, prior to sintering, has a surface area of at least about 1.5 m$^2$/g and which at normal operating temperature (generally about 600°-950° C.) is conductive of and permeable to oxygen ions but not other components of air. Examples are stabilized zirconia, preferably yttria-stabilized zirconia, thoria, $\beta$-alumina, and mullite.

The most preferred solid electrolyte material for use in this invention is stabilized zirconia, preferably mixed with an oxide of calcium, magnesium, or yttrium in an amount that will wholly or partially stabilize the zirconia upon firing. Zirconia is "wholly" or "partially" stabilized depending upon whether the amount of the stabilizing oxide is sufficient to form a cubic phase solid solution with all or only part of the zirconia. For calcia, as little as 4 weight percent, based on the total calcia and zirconia weight, is sufficient to partially stabilize the zirconia, and about 10 weight percent is generally sufficient to fully stabilize it. For magnesia and yttria, the corresponding ranges are about 3-21% by weight and about 4-16% by weight respectfully. A very suitable material for use in accordance with the present invention is zirconia admixed with at least about 10 weight percent yttria and most preferably an amount of yttria sufficient to fully stabilize the zirconia. Preferably the starting zirconia material has a residual silica content of not more than about 0.3 weight percent.

In the honeycomb structures useful in the method of this invention, at least some of the channels are hermetically sealed at one face of the honeycomb or the other. More particularly, in the honeycomb used in a first embodiment of the invention, certain channels are sealed at one face of the honeycomb and the remaining channels sealed at the other face. In the honeycomb structures used in a second embodiment of the invention, certain channels are sealed at a first face of the honeycomb, but the remaining channels are open at both faces.

Preparation of such ceramic honeycomb structures having selectively sealed channels can be accomplished by methods known in the ceramic arts. For example, U.S. Pat. No. 4,329,162 (issued May 11, 1982, to Pitcher) discloses ceramic honeycomb structures in which selective seals are provided to designated inlet and outlet channels of the honeycombs by injecting a sinterable material or other sealing cement into the appropriate ends of the channels to form a desired array of open/closed channels at each end face. U.S. Pat. No. 4,283,210 (issued Aug. 11, 1981, to Mochida et al) discloses a method of forming a ceramic honeycomb monolith with selectively sealed channels in which the selective sealing is effected by bending and bonding the partition walls of given channels at one of the end faces of a green ceramic honeycomb body, and performing the same operation with the remaining channels at the other end face of the body. U.S. Pat. No. 4,557,773 (issued Dec. 10, 1985, to Bonzo) discloses another method of providing selectively sealed channels to monolithic ceramic honeycomb structures by applying a solid covering over the end faces of the honeycomb; piercing the covering of selected channels through the use of an array of pins or piercing elements controlled by a processor connected to optical or other scanning means that can detect channel openings beneath the covering; and contacting the end face of the honeycomb with a flowable sealing material that enters and seals the ends of the channels that have been exposed through the covering. The disclosures of U.S. Pat. Nos. 4,329,162 and 4,283,210 are incorporated herein by reference in their entirety; the disclosure of U.S. Pat. No. 4,557,773 that appears at column 14, line 44, through column 15, line 32, is directed to the use of a processor connected to optical scanning means for exposing selected channels, is also incorporated herein by reference.

In a most preferred method for the preparation of a ceramic honeycomb body having selectively sealed channels for use in this invention, a green ceramic honeycomb having a plurality of through-and-through open channels is capped with a substantially flat green body at each of its faces to initially seal all the channels.

The openings of certain channels are then exposed through the cap at one face of the honeycomb and the remaining channels are exposed through the cap at the other face. (It will be noted that for the preparation of a honeycomb to be used in the second embodiment of the method of the invention, wherein certain channels are sealed at only one face and the remaining channels are open at both faces, a flat capping body as described above is used at only one face of the green honeycomb.) Thereafter, the composite capped structure is fired in order to sinter the honeycomb and its end caps into a substantially integral body, and an electrically-conductive coating is then applied to the interior channel walls, as described more fully below, to form two electrode surfaces. This method is the subject of my co-pending U.S. patent application, with joint inventor L. E. Hampton, entitled "Preparation of Ceramic Honeycomb Structure Having Selectively Sealed Channels," which is Ser. No. 07/454,524, filed Dec. 21, 1989.

With particular reference to this preferred procedure for forming the honeycombs having selectively sealed channels, a green ceramic honeycomb body is first prepared according to processes normally practiced in the ceramic art. The constituent ceramic materials are preferably admixed into a substantially homogeneous batch with about 1-30% by weight, based on the total batch weight, of a temporary binder. The constituent ceramic materials are generally in particulate form, preferably of a size finer than 75 microns, and more preferably in a size finer than about 50 microns. Any binder material conventionally used in ceramic catalyst support manufacture is suitable. Preferred are binders that are decomposed and burned-off at temperatures of about 250°-600° C. Examples are disclosed in: "Ceramic Processing Before Firing," ed/by George Y. Onoda, Jr. & L. L. Hench, John Wiley & Sons, New York; "Study of Several Groups of Organic Binders Under Low-Pressure Extrusion," C. C. Treischel & E. E. Emrich, Journ. Am.Cer.Soc. (29), pp. 129-132, 1946; "Organic (Temporary) Binders for Ceramic Systems," S. Levine, Ceramic Age, (75) No. 2, pp. 39+, January 1960; and "Temporary Organic Binders for Ceramic Systems" S. Levine, Ceramic Age, (75) No. 2, pp. 25+, February 1960. A most preferred binder is methyl cellulose, one example of which is METHOCEL A4M, available from the Dow Chemical Co.

Mixing of the batch ingredients is preferably performed in a step-wise procedure in which any initially dry ingredients are first blended together. This preliminary dry-blending operation can be performed in any conventional mixing equipment but the use of an intensive mixer having both barrel and mixing blade rotation is preferred. The dry mixture is then plasticized by being further mixed, preferably in a mix muller, with a liquid medium (preferably water) which acts as a plasticizer. During this stage, any remaining constituents are added. Up to about 1% by weight, based upon total mixture weight, of a surfactant such as sodium stearate can also be added to facilitate mixing and flow for subsequent processing. Mixing of all constituents should be continued until a homogenous or substantially homogeneous plasticized mass is obtained.

The plasticized batch is ultimately formed into the desired "green" honeycomb shape, preferably by extrusion through a die or by injection molding. (As used herein, "green" refers to the state of the constituent ceramic materials, generally admixed together with binders and molded, prior to being fired or sintered.)

The monolithic honeycomb so-formed generally has two substantially flat surfaces or "faces" and a plurality of substantially parallel open channels that extend longitudinally through the honeycomb between the faces. The transverse cross-sectional configuration of the channels is generally of any rounded (i.e. circular or elliptical) or polygonal (i.e., triangular; rectangular, preferably square; or hexagonal) shape. Generally the honeycomb contains 50-1000, more preferably about 100-400, of these through-and-through channels per square inch of facial surface area. The transverse cross-sectional configuration of the honeycomb itself is preferably circular, elliptical, or hexagonal. For purposes of the present invention, in which the honeycomb is intended for oxygen separation/concentration or fuel cell applications, the honeycomb will generally be shallower than it is wide.

With respect to preparation of a green honeycomb made from the preferred stabilized zirconia material, the batch includes, as the ceramic materials, zirconia and sufficient magnesia, calcia, or yttria to provide the desired level of stabilization as described above. The magnesia, calcia, or yttria component can be added in the form of a precursor compound, usually a salt, that is heat-decomposable to the metal oxide itself. Examples of such precursor compounds are the metal oxylates, nitrates, carbonates, and acetates, and in the case of yttrium, the chloride salt as well. The amount of precursor used is that which, after ultimate firing of the honeycomb structure, will generate an amount of corresponding stabilizing metal oxide, relative to the zirconia, that is sufficient to wholly or partially stabilize the zirconia as described above.

The zirconia and stabilizing metal oxide materials are preferably added to the batch in a particulate form finer than 10 microns, and preferably less than 1 micron. Where the starting zirconia material has an average particle size greater than about 3 microns, a sintering aid can optionally be added to the batch in an amount of about 0.5-3.0 weight percent. Preferred sintering aids are those that, upon firing and formation of the cubic zirconia, tend to form crystalline mullite or magnesium-aluminate spinel at the cubic grain boundaries. The batch also contains about 3 weight percent of a temporary organic binder.

In all cases, the extruded or injection-molded green honeycomb shape is generally dried at about 100°-120° C., preferably by steam heat, to impart some rigidity and structural strength to the honeycomb for further processing according to the invention.

The green honeycomb thus formed is next fitted at each face with an end cap, formed of a body of a green ceramic material, in order to seal the channel openings. The end caps are each prepared from a batch of plasticized ceramic material that is formed, for example by means of a press die or extrusion die, into a substantially flat body of a size and shape sufficient to completely cover the faces of the honeycomb. It is preferred that the end cap be about as thick as the partition walls that define the honeycomb channels and separate them from each other. This dimension is most preferably about 5-75 mils (about 0.013-0.19 cm). The ceramic mixture used to form the end caps is preferably, but need not be, the same material from which the honeycomb itself is made and is most preferably taken from the same batch, but it is generally not necessary for the ceramic material used for the end caps to have solid electrolyte properties. When the ceramic material used for the end caps is different from that used for the honeycomb, however, it is preferred that it be a ceramic that sinters at substantially the same temperature as the honeycomb ceramic material and has a coefficient of thermal expansion over the range of room temperature to its sintering temperature that is not more than about 10% different from the coefficient of thermal expansion of the honeycomb ceramic material. The shaped end caps will preferably not be dried prior to their application to the faces of the honeycomb but rather will be allowed to retain a plasticized consistency. In this state, the moisture content of the material is generally about 10–13% by weight.

According to this step of the honeycomb preparation process, each face of the dried green honeycomb is wetted, preferably with water, to re-plasticize the ceramic material at the face, and a still-wet end cap body is then firmly fitted onto each face with sufficient force to integrate the plasticized ceramic material of each into a substantially continuous phase. Any excess material from the end cap that extends beyond the sides of the honeycomb itself as a result of this pressing operation can be trimmed off so that the edges of the end caps are flush with the sides of the honeycomb.

The end caps are then selectively perforated to expose the openings of given channels of the underlying honeycomb at one face and the openings of the remainder of the channels at the other face of the honeycomb. This can be effected by manual perforation of the end caps by a hand-held punch or tool having a pin that is sized and shaped appropriately to pierce the end cap in a manner congruent with the size and shape of the channel openings to be exposed. Preferably, however, this operation will be carried out automatically by, for example, imaging analysis in which an array of piercing pins, controlled by a processor connected to optical or other scanning means, is used to pierce the end caps to expose the desired openings. The scanning means can optionally be equipped with a "penetrating" component such as an ultrasound or x-ray device, for location of the channels after the end cap has been applied. In the absence of such a component, the faces of the honeycomb will be scanned, and signals corresponding to the location of the channels processed and stored, prior to fitting of the end caps. Such automatic operation using an array of process tools or pins is particularly well suited for use when the selectively exposed channels at each face are to be regularly spaced such as in a "checkerboard" pattern or in a pattern of alternating rows of channels. A suitable method and apparatus for control and piercing by image analysis is disclosed in U.S. Pat. No. 4,557,773 (issued Dec. 10, 1985, to Bonzo), which is hereby incorporated by reference.

Following perforation of the end caps, the composite structure is then fired to harden and densify the material and to integrally join the end caps to the material of the honeycomb body itself. Most preferably the firing is performed at a temperature and for a time sufficient to effect actual sintering of the ceramic material. The exact firing schedule, as those skilled in the art will recognize, will be dictated primarily by the identity of the ceramic materials. With particular respect to the preferred embodiment of this invention, in which both the honeycomb itself and the end caps are composed of yttria-stabilized zirconia, a preferred firing schedule is to heat the material to a temperature of about 1400° C. over a 35-hour period; further heat from that temperature to a sintering temperature of about 1650°–1800° C., preferably about 1750° C., over a 16-hour period; hold the material at the sintering temperature for about 4 hours; cool the material to about 1000° C. over a 20-hour period; and then further cool the material from that temperature back to room temperature over about a 10-hour period.

Figure 2:
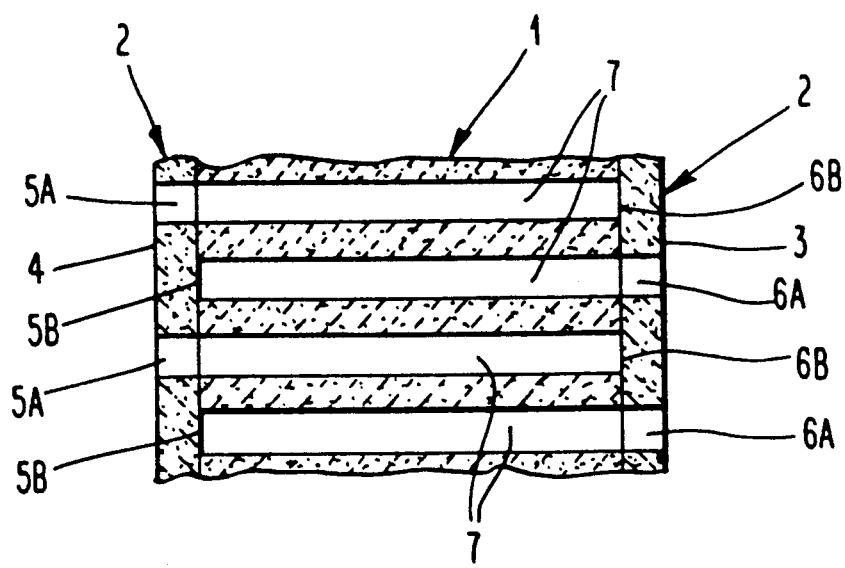
FIG. 2 is a partial cross-section of the honeycomb of FIG. 1 along line A—A.

An example of a honeycomb thus formed with selectively sealed channels is shown in FIGS. 1 and 2. In those figures, the honeycomb, designated generally as 1, has two end caps 2 adhering to and, upon firing and sintering, integrally forming a part of face 3 and face 4 of the honeycomb. The end caps 2 are shown in exaggerated outline to indicate their disc-like shape. It will be understood, however, that after firing or sintering, the end caps will be integrally sealed to the honeycomb itself and there will generally be no discernible boundary between them, particularly when the end caps are of the same ceramic composition as the honeycomb. The honeycomb has a plurality of channels 7, shown here in square cross-section, separated by thin partition walls, shown unnumbered. In FIGS. 1 and 2, the cross-sectional size of the channels has been exaggerated, and few channels shown, for sake of clear illustration. Selected channels are blocked at face 3 by unpierced portions of the end cap, as indicated generally by blocked openings 6B, but are open at face 4, as shown generally at 5A. The remaining channels are oppositely blocked at face 4, as indicated generally at 5B, but open at face 3, as shown generally at 6A. The general configuration of selectively blocked channels in FIGS. 1 and 2 forms a preferred pattern of parallel alternating rows.

The honeycombs are then coated with an electrically conductive material in a manner to connect the interior walls of the channels that are open at face 3 and to form therefrom a first electrode, and to connect the interior walls of the channels that are open at face 4 to form therefrom a second electrode. More particularly, the electrically conductive material is applied by conventional methods in a manner that will provide one face and the interior walls of the channels open to it with a continuous coating, thereby forming a first electrode surface, and which will provide the other face and the interior walls of the channels open to that face with a separate continuous coating, thereby forming a second, separate electrode surface. Necessary characteristics of the electrode material are permeability to oxygen and stability and durability under operating conditions, which will generally be in the range of about 600°–950° C. Examples of such materials are silver, platinum, lanthanum-strontium-manganite complexes, silver/palladium mixtures, and mixtures of silver/palladium and the lanthanum complexes. The electrode material is generally dispersed in a suitable liquid carrier to form a paste or ink and thereafter applied by conventional methods such as, for example, brush coating or dip coating. Alternatively, the materials can be applied in powder form, such as a particulate mixture of silver and palladium, and the honeycomb structure then heated to a temperature sufficient to sinter or to melt and alloy the powders to form a continuous coating. Preferably the electrode material is applied after the composite honeycomb itself has been sintered, but application of the electrode material, especially when it is in powder form, can in appropriate cases take place just prior to sintering so that the sintering of the ceramic and the sintering or melting/alloying of the electrical coating material can take place in a single operation.

In the method of concentrating or separating oxygen using a honeycomb as just described, one or more such honeycombs are arranged so that one face of each such honeycomb is hermetically isolated from the opposite face of that honeycomb, for example by arranging the honeycomb so that one face communicates with a first chamber and the second face is open to and communicates with a second chamber that is hermetically isolated from the first. In operation of the method, air or another oxygen-containing gas is introduced into the channels open at a first (inlet) face of the honeycomb. The honeycomb body is then heated to a temperature at which the ceramic material is sufficiently conductive, generally about 600°–950° C. A first voltage is then applied to the interior walls of the channels open to the inlet face, and a second voltage applied to the interior walls of the channels open at the second (or outlet) face, thereby creating an electrical potential across the ceramic materials separating any adjacent inlet-open and outlet-open channels. This electrical potential drives oxygen ions from the air or other oxygen-containing gas through the channel walls, and concentrated oxygen is released into the channels open to the outlet face and there collected.

Althoug the oxygen-containing gas, such as air, can be actively directed or forced into the inlet-open channels, such as by means of a blower or through release of some other pressurized source of gas, such a step is not necessary. Where, for example, the oxygen-containing gas is air, it will often be sufficient merely to expose the inlet-face to ambient air. Nevertheless, more efficient operation of the method takes place when a constantly refreshed supply of air is directed by some means to the inlet face in order to replenish the spent "nitrogen-rich" air in the interior of the inlet-open tubes. Likewise, some form of suction or vacuum can be used to facilitate collection of the oxygen at the outlet face.

In the use of the above-described honeycomb in a fuel-cell operation, pure oxygen or an oxygen-rich gaseous mixture is introduced to one face of the honeycomb and into the channels open to that face. When the honeycomb is heated to its operating temperature of about 600°–950° C., oxygen ions will pass through the walls of the honeycomb, driven by the concentration gradient, to channels open to the other face of the honeycomb and will there recombined to form oxygen. So long as oxygen is continuously removed from the channels open to this second face of the honeycomb, thereby maintaining the concentration gradient across the different sets of channels, oxygen ions will continue to be transported through the honeycomb walls to generate voltage.

Figure 3:
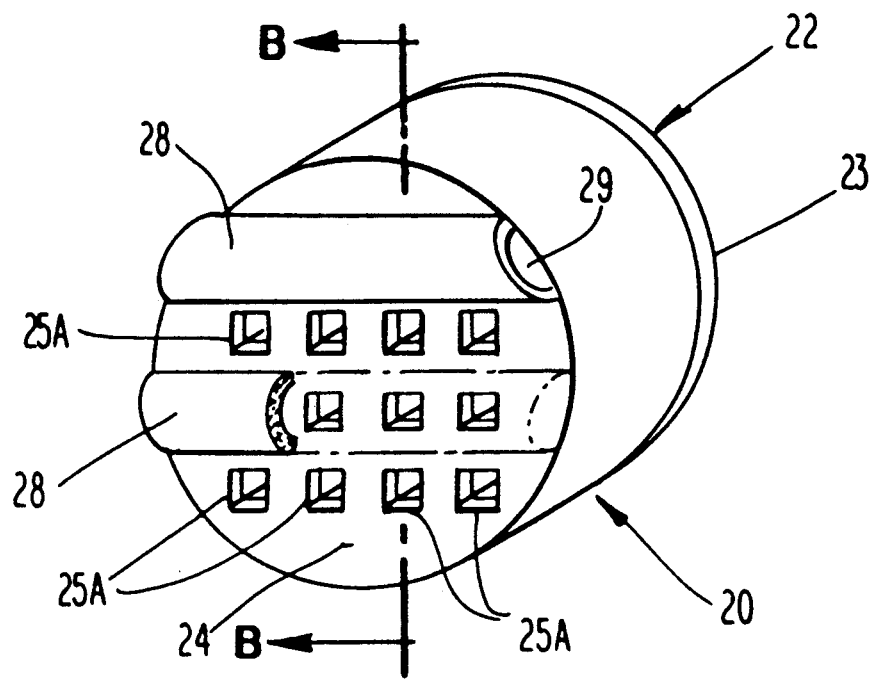
FIG. 3 is a perspective view of another embodiment of a ceramic honeycomb useful in the method of the invention having two manifold passageway structures covering certain channel openings at one face thereof.
Figure 4:
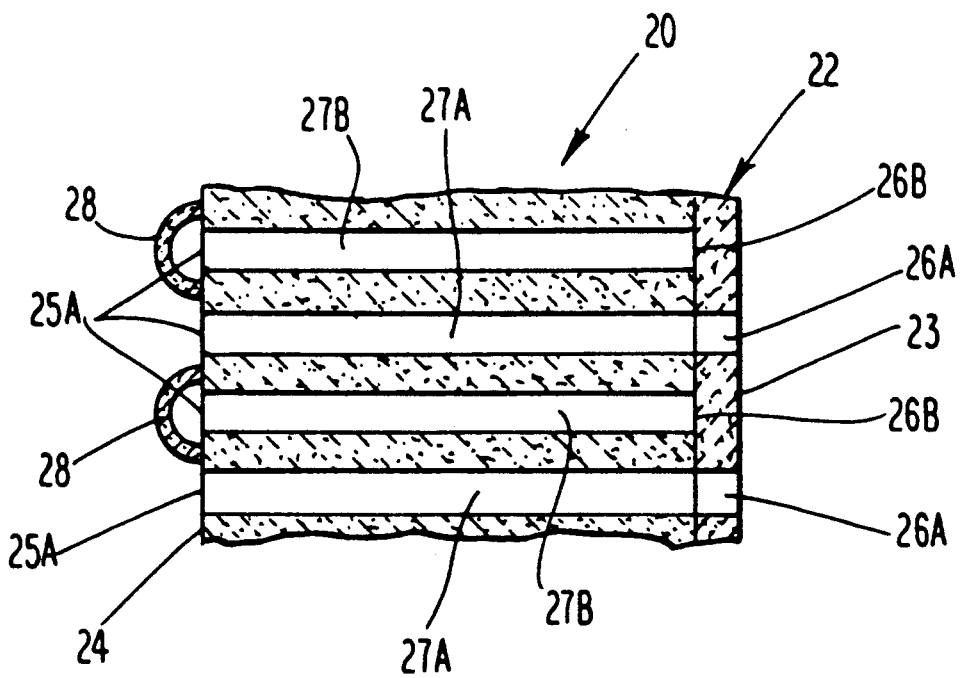
FIG. 4 is a partial cross-section of the manifold-containing honeycomb of FIG. 3 along line B—B.

According to FIGS. 3 and 4, there is shown a variation of the honeycomb structure described above having manifolding elements for the collection of oxygen. The manifolded honeycomb of these figures is useful in another embodiment of the oxygen concentration/separation method of this invention. As will be described in greater detail, these honeycombs are prepared in a manner similar to that described above with the exception that end-capping material is applied to a single face only of the honeycomb, and then punctured to expose selective channels therethrough, leaving all channels open at the other face of the honeycomb.

With more particular respect to FIGS. 3 and 4, the honeycomb, designated generally as 20, has a single end cap 22 adhering to and, upon firing and sintering, integrally forming a part of face 23 of the honeycomb. The end cap 22 is shown in exaggerated outline to indicate its disc-like shape. It will again be understood, however, that after firing or sintering, the end cap will be integrally sealed to the honeycomb itself and there will generally be no discernible boundary between them. The honeycomb has a plurality of channels 27A and 27B, shown here in square cross-section, separated by thin partition walls, shown unnumbered. In FIGS. 3 and 4, the cross-sectional size of the channels has been exaggerated, and few channels shown, for sake of clear illustration. All channels are open at face 24 of the honeycomb, as shown generally by openings 25A. Channels 27A are open as well at face 23, as shown by openings 26A. Channels 27B are blocked at face 23 by unpierced portions of the end cap, as indicated generally by blocked openings 26B. Channels 27A, open at both ends, and 27B, open only at a single end of the honeycomb, are preferably arranged in alternating parallel rows as shown.

The honeycomb of FIGS. 3 and 4 is provided with a plurality (two shown) of manifolding elements, shown generally at 28, each manifolding element covering a row of openings of channels 27B at face 24. As shown, each manifolding element has an open interior passage providing common communication among all covered openings 25A in the row of channels 27B, and each manifolding element has a single exterior outlet 29. Each manifolding element is integral with the honeycomb itself at face 24 and hermetically seals the channel openings covered by the manifolding element from the rest of the exterior of face 24, except as noted at single opening 29. Outlet 29 is adapted for receiving further tubing or gas flow equipment, as will be discussed below, for the collection of oxygen discharging into the manifold from channels 27B.

The manifold-containing honeycombs of FIGS. 3 and 4 are prepared in a manner similar to that described for the non-manifolded honeycombs of FIGS. 1 and 2. More particularly, a green ceramic honeycomb having a plurality of through-and-through channels is first prepared as described above and thereafter is fitted at a single face thereof, such as face 23 in FIGS. 3 and 4, with an end cap formed of a body of green ceramic material in order to seal the channel openings at that face. All descriptions of the end cap, their preparation, and their fitting onto the honeycomb provided earlier apply as well to the process described here for the single end cap. The end cap is then selectively perforated to expose the openings of given channels at the otherwise capped face. The perforation procedure also as earlier described. In the honeycomb of FIGS. 3 and 4, for example, the cap 22 will be pierced in a manner to provide alternating rows of channels that are open at face 23 as well as uncapped face 24 (channels 27A) and channels that remain sealed at face 23 (channels 27B). The honeycombs are then coated with an electrically conductive material, again as earlier described, in a manner to connect the interior walls of channels 27A to form therefrom a first electrode, and to connect the interior walls of channels 27B to form therefrom a second, separate electrode.

From this stage of the honeycomb preparation, the manifolding element is affixed to the honeycomb body. In a preferred procedure, the manifolding element is composed of the same ceramic material from which the honeycomb itself was made and is affixed to the honeycomb body while both are still in the green, unfired state. According to this procedure, plasticized green ceramic material is formed into the desired shape of the manifolding element, for example the half-cylinder shape depicted in FIG. 3, and then firmly applied to face 24 over an appropriate row of channel openings in that face. This step is most conveniently carried out with the use of a templating shape, such as a thin rod, which can be placed directly over the appropriate row of channel openings so that the ceramic material can be molded over it and formed into the shape of the manifold. The shaping rod is easily removed by drawing it longitudinally out of the shaped material, thereby leaving an opening that to form outlet 29 of the manifold. Following this manifold-shaping step, the honeycomb structure is fired to harden and densify the material and to integrally join the end cap at face 23 and the manifolding elements at face 24 to the honeycomb body itself. Most preferably, the firing is performed at a temperature and for a time sufficient to effect actual sintering of the ceramic material. Alternatively, the shaping rod can be left in place during the sintering step to insure that the manifolding element retains it proper form and withdrawn from the structure after it has been fired and hardened. The shaping rod can be any non-reactive material, such as poly-tetrafluoroethylene, although when the shaping rod is to be retained in the structure during the firing step, it must additionally be of a material capable of withstanding the firing temperatures.

In a preferred variation of the procedure for providing manifolding elements, some of the green ceramic material along the row of channel openings to be manifolded is first removed to create a trough running completely across the face of the honeycomb and having a depth of approximately twice the width of the channel openings. The channel openings to be manifolded will be at the approximate center-line of the bottom of the trough. The shaping rod that is used has a square or rectangular transverse cross-section with a maximum transverse dimension of approximately half of the trough depth. With the shaping rod positioned in the trough, covering the channel openings, additional ceramic material is applied to fill in the top portion of the trough, covering the shaping rod. The honeycomb is then fired to harden and densify the ceramic material and to integrally join the green ceramic material used to fill in the trough with the honeycomb body itself. Removal of the shaping rod after firing leaves the manifold passage, with a single outlet, connecting the row of channel openings at face 24. This variation provides a manifolding element which, unlike the half-cylindrical shape of manifolding element 28 shown in FIGS. 3 and 4, is substantially flush with face 24.

In the method according to this invention of concentrating or separating oxygen using a manifolded honeycomb as just described, the outlets 29 of the manifolding elements are connected with suitable gasketing material to appropriate gas collection means, such as tubing, for the collection of oxygen exiting channels 27B to and through the manifold. With more particular reference to the operation of this method, air or another oxygen-containing gas is introduced at one or both faces of the honeycomb into channels 27A, which are open at both faces. The honeycomb body is heated to an operating temperature of about 600°-950° C. Through the electrodes composed of the electrically conductive material previously described, a first voltage is applied to the interior walls of channels 27B, which are open only at face 24 to the manifold, and a second voltage is applied to the interior walls of channels 27A, thereby creating an electrical potential across the ceramic material separating the rows of channels. This electrical potential drives oxygen ions from the air or other oxygen-containing gas in channels 27A through the partition walls, and concentrated oxygen is released into channels 27B. The oxygen released into channels 27B flows, by virtue of the pressure generated by its release into those channels, to the passageway of manifold 28 and through manifold outlet 29 to the collection means, not shown. Optionally, the collection means can comprise vacuum generating means to draw the oxygen more efficiently from channels 27B and through the manifold.

By virtue of the presence of manifolding element 28 over the openings of channels 27B at face 24, those channels are hermetically isolated from the exterior of face 24, thereby permitting face 24 as well as face 23 to be exposed to the supply source of oxygen-containing gas for the introduction of that gas into channels 27A. As is the case with the earlier-described embodiment of the invention, it is generally sufficient merely to expose the supply faces to a source of oxygen-containing gas, such as ambient air. Nevertheless, more efficient operation of the method occurs when a constantly refreshed supply of air is forced through channels 27A from one face to the other, such as by means of a blower, in order to replenish any spent "nitrogen-rich" air within channels 27A.

The characteristic of solid electrolytes as electrically conductive, oxygen-permeable materials, as described herein, is also known as oxygen-ion conductivity, which differs from electronic conductivity (i.e. simple conduction of electrons manifesting well known electricity) although both produce electrical potential differences across the solid electrolyte between electrodes or contacts thereon.

What is claimed is:

1. A method of separating or concentrating oxygen from air or other gaseous mixture, comprising:
   (a) providing a die-formed monolithic honeycomb body of ceramic material which is an oxygen-ion conductive solid electrolyte, said honeycomb body having an inlet face and an outlet face and a plurality of substantially parallel channels that are separated from each other by partition walls and that extend through the body between said faces, wherein (1) selected channels are hermetically sealed at the inlet face and open at the outlet face, and the remaining channels are hermetically sealed at the outlet face and open at the inlet face, and (2) said inlet-open channels have a first electrically-conductive coating on the interior walls thereof forming a first electrode surface, and said outlet-open channels have a second electrically-conductive coating on the interior walls thereof forming a second, separate electrode surface;
   (b) applying a first voltage through said first electrode surface to the interior walls of said inlet-open channels and a second voltage through said second electrode surface to the interior walls of said outlet-open channels, whereby an electrical potential is created between any adjacent inlet-open and outlet-open channels;
   (c) introducing an oxygen-containing gaseous mixture to the inlet face of the honeycomb; and
   (d) collecting oxygen at the outlet face.

2. The method of claim 1 wherein said ceramic material is selected from the group consisting of stabilized zirconia, β-alumina, mullite, thoria, and mixtures of these.

3. The method of claim 1 wherein said introducing step includes actively directing the air or other oxygen-containing gaseous mixture to the inlet face of the honeycomb.

4. The method of claim 3 wherein said collecting step includes collecting the oxygen with vacuum means for drawing oxygen from said outlet-open channels.

5. The method of claim 1 wherein the oxygen is separated or concentrated from air, and the ceramic material of the honeycomb consists essentially of stabilized zirconia.

6. The method of claim 5 including the step of heating the honeycomb to a temperature of at least 600° C. prior to said introducing step.

7. A method of separating or concentrating oxygen from air or other gaseous mixtures, comprising:
  (a) providing a die-formed monolithic honeycomb body of ceramic material which is an oxygen-ion conductive solid electrolyte, said honeycomb body having first and second faces and a plurality of substantially parallel channels separated from each other by partition walls and extending through the body between said faces, wherein (1) selected channels for oxygen collection are hermetically sealed at the first face and open at the second face, and the remaining channels are open at both faces, (2) said oxygen channels have a first electrically-conductive coating on the interior walls thereof forming a first electrode surface, and the remaining channels have a second electrically-conductive coating on the interior walls thereof forming a second, separate electrode surface, and (3) said oxygen channels and said remaining channels are arranged in said honeycomb in parallel alternating rows;
  (b) providing a separate manifold to cover the openings of each row of oxygen channels at the second face and to hermetically isolate each of said covered rows of openings from openings of said remaining channels at the second face, each manifold having a single outlet whereby the oxygen channel openings covered by each said manifold are in communication with each other and with the single outlet of said manifold;
  (c) applying a first voltage through said first electrode surface to the interior walls of said oxygen channels and a second voltage through said second electrode surface to the interior walls of said remaining channels, whereby an electrical potential is created between adjacent oxygen channels and remaining channels;
  (d) introducing an oxygen-containing gaseous mixture into the openings of said remaining channels; and
  (e) collecting oxygen at the outlets of said manifolds.

8. The method of claim 7 wherein said ceramic material is selected from the group consisting of stabilized zirconia, $\beta$-alumina, mullite, thoria, and mixtures of these.

9. The method of claim 7 wherein each manifold is of a ceramic material selected from the group consisting of stabilized zirconia, $\beta$-alumina, mullite, thoria, and mixtures of these and wherein each manifold is integral with the ceramic material of the honeycomb body.

10. The method of claim 9 wherein oxygen is separated or concentrated from air and wherein the ceramic material of said honeycomb and said manifolds is stabilized zirconia.

11. The method of claim 10 in which the outlets of each of said manifolds are interconnected to a single gas collection means for combining the oxygen from each of said manifolds.

12. The method of claim 11 wherein said collecting step includes collecting the oxygen with vacuum means for drawing the oxygen through said gas collection means from said manifolds.

* * * * *

UNITED STATES PATENT AND TRADEMARK OFFICE
CERTIFICATE OF CORRECTION

PATENT NO. : 5,034,023

DATED : July 23, 1991

INVENTOR(S) : David F. Thompson

It is certified that error appears in the above-identified patent and that said Letters Patent is hereby corrected as shown below:

Column 5, line 61, -- homogenous --      Page 9, line 30.
should read -- homogeneous --.

Column 9, line 23, -- Althoug --      Page 16, line 1.
should read -- Although --.

Signed and Sealed this

Ninth Day of February, 1993

*Attest:*

STEPHEN G. KUNIN

*Attesting Officer*      *Acting Commissioner of Patents and Trademarks*